Sept. 26, 1967  G. C. NESTLER  3,344,039
COKE OVEN BATTERY REVERSING APPARATUS
Filed Jan. 8, 1964  8 Sheets-Sheet 1

INVENTOR.
GILBERT C. NESTLER.
BY
his ATTORNEY.

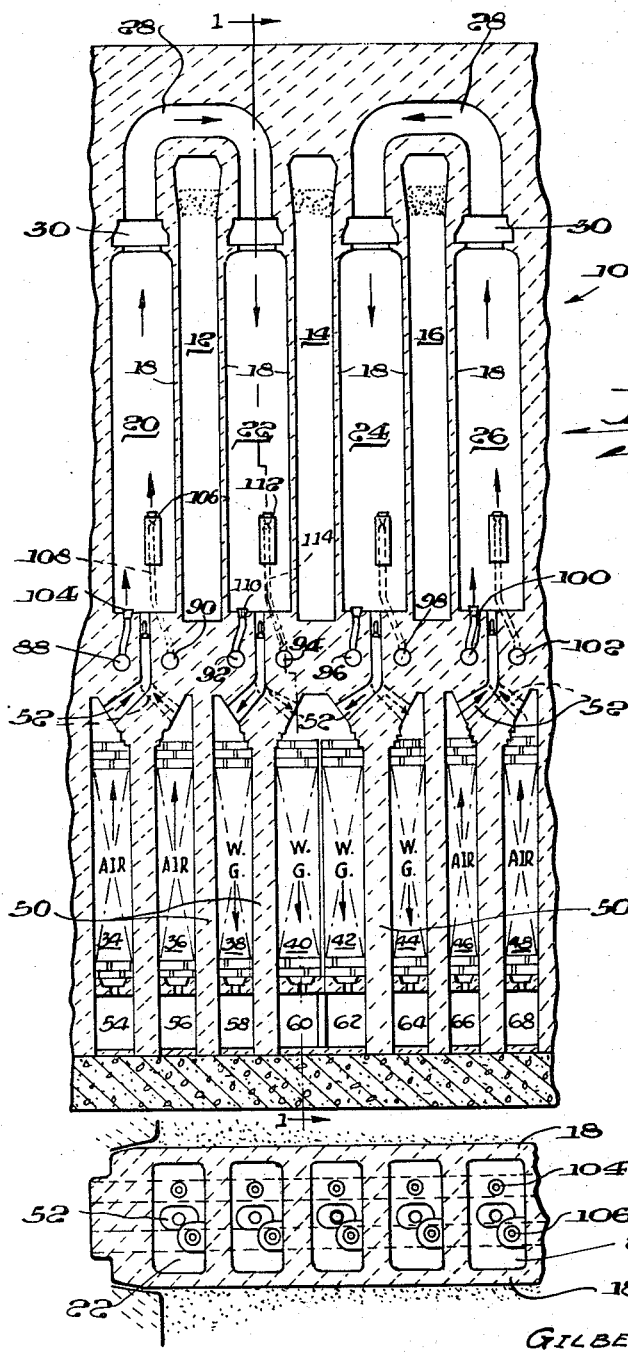

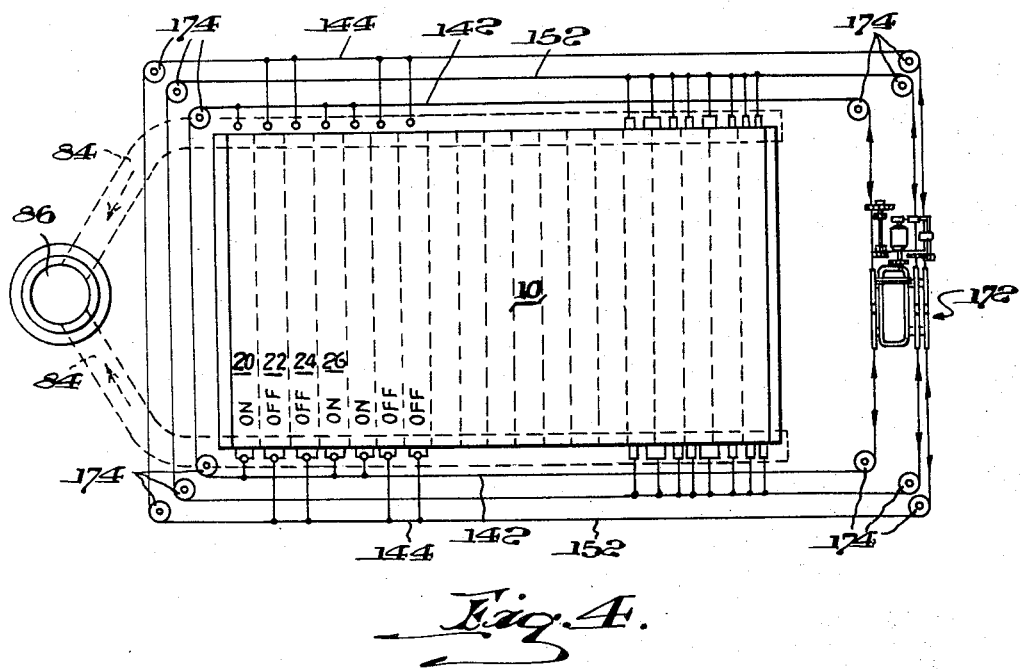

Sept. 26, 1967     G. C. NESTLER     3,344,039
COKE OVEN BATTERY REVERSING APPARATUS Filed Jan. 8, 1964     8 Sheets-Sheet 4

INVENTOR.
GILBERT C. NESTLER.
BY Stanley Stein
HIS ATTORNEY.

Sept. 26, 1967 G. C. NESTLER 3,344,039
COKE OVEN BATTERY REVERSING APPARATUS
Filed Jan. 8, 1964 8 Sheets-Sheet 5

INVENTOR.
GILBERT C. NESTLER
BY Stanley J Price
his ATTORNEY

Sept. 26, 1967 G. C. NESTLER 3,344,039
COKE OVEN BATTERY REVERSING APPARATUS
Filed Jan. 8, 1964 8 Sheets-Sheet 6

INVENTOR.
GILBERT C. NESTLER
BY Stanley J. Price
his
ATTORNEY.

Sept. 26, 1967  G. C. NESTLER  3,344,039
COKE OVEN BATTERY REVERSING APPARATUS
Filed Jan. 8, 1964  8 Sheets-Sheet 7
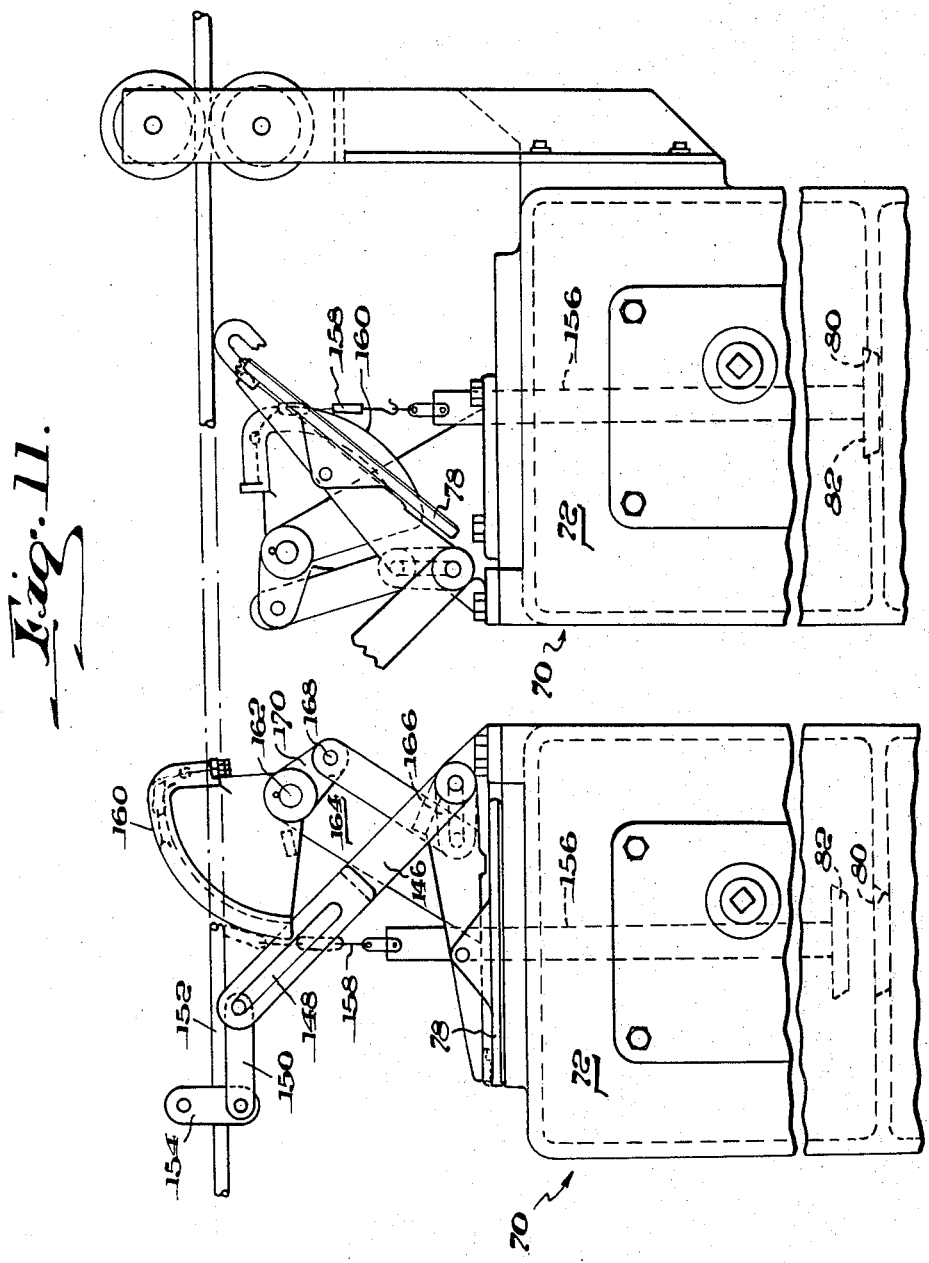
INVENTOR.
GILBERT C. NESTLER.
BY Stanley J Price
his ATTORNEY.

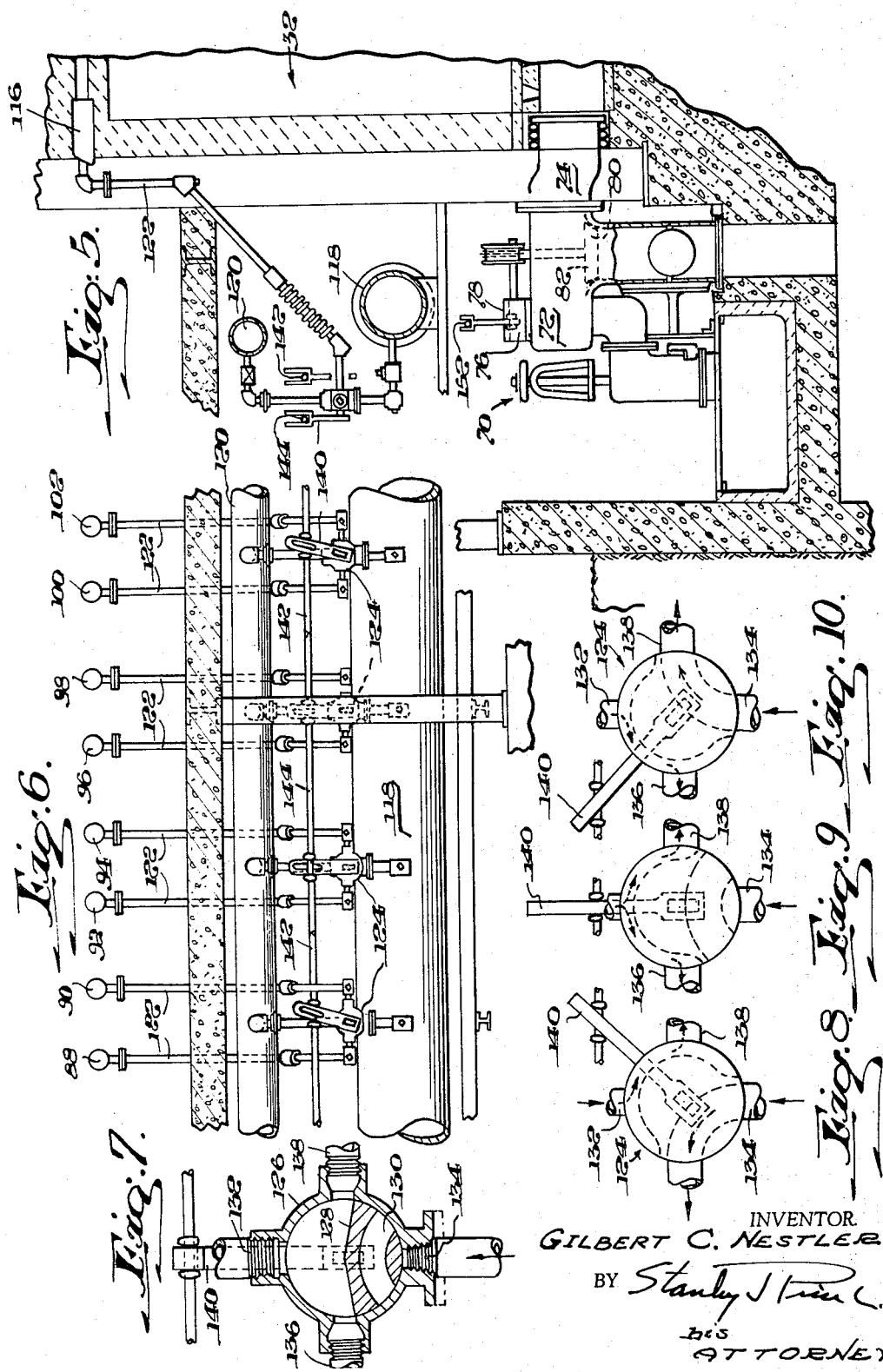

United States Patent Office 3,344,039
Patented Sept. 26, 1967

3,344,039
COKE OVEN BATTERY REVERSING APPARATUS
Gilbert C. Nestler, Pittsburgh, Pa., assignor to Koppers Company, Inc., a corporation of Delaware
Filed Jan. 8, 1964, Ser. No. 336,435
6 Claims. (Cl. 202—144)

ABSTRACT OF THE DISCLOSURE

Reversing apparatus for a regenerative coke oven having high and low burners. A pair of cams having protuberances, recessed portions and a regular peripheral surface between the protuberance and the recessed portion are connected to a pair of shafts and rotated in timed relation to each other. A lever member is positioned between the pair of cams and maintained in a neutral position by the regular peripheral surface of the cams. In this neutral position, control devices connected to the lever member supply decarbonizing air to the high burners and the low burners. Rotation of the cam devices so that a protuberance on one cam opposes a recessed portion on the other cam pivots the lever in one direction to actuate the control device and supply fuel gas to the high burner and decarbonizing air to the low burner. Further rotation of the cams so that the protuberance on the other cam opposes a recessed portion on the first cam pivots the lever in the opposite direction to actuate the control device and supply fuel gas to the low burner and decarbonizing air to the high burner. Two pairs of cams are connected to the shafts in a manner that one lever remains in a neutral position when the other lever is pivoted in either direction.

---

This invention relates to improved reversing apparatus for regenerative horizontal coking retort ovens and more particularly to improved apparatus for reversing the flow of air and waste gas through the vertical flame flues and for controlling the flow of fuel gas and decarbonizing air to the high and low burners on the respective flame flues.

In the design and construction of regenerative horizontal coking retort ovens, one of the primary objectives in recent years has been to increase oven capacity without adversely affecting the quality of the coke produced therein. To attain this objective the height of the coking chamber has been increased and high and low burners are utilized in the flame flues to provide heat for the coking chambers. The high and low burners are arranged to facilitate the distribution of the heat uniformly through the heating walls to the coal in the coking chambers of increased height.

A serious problem is encountered when both the high and low burners are burning simultaneously. The riser passages that convey the rich fuel gas to the high burner nozzles frequently clog with a carbonaceous material when both the high and low burners are burning simultaneously. The rich fuel gas as it is conveyed through the high level riser passages is subjected to elevated temperatures from the heat generated by the burning of the fuel gas in the low burner. This elevated temperature causes a thermal decomposition of the rich fuel gas in the riser passages and deposits a carbonaceous residuum on the riser passage walls. This carbonaceous residuum causes a serious operating problem. If the upper or high level riser passages become clogged, the upper or high level burners become inoperative and cannot be burned out with air.

It has been discovered by burning the high and low burners sequentially rather than simultaneously, it is now possible to eliminate the previously discussed problem of carbon deposits in the riser passages to the high burner. In a burning cycle where rich fuel gas is fed only to the high burner for a preselected time and thereafter the rich fuel gas is fed to the low burner and decarbonizing air is simultaneously fed to the high burner, the riser passages to the high burner are not subjected to the elevated temperatures while rich fuel gas is being conveyed therethrough. The burning cycle wherein rich fuel gas is fed sequentially to the high and low burners is described and claimed in copending application Ser. No. 250,336, entitled "The Heating of High Chambered Horizontal Coke Ovens," assigned to the assignee of the present invention now Patent 3,222,260.

The sequential burning in the high and low burners presents problems in the proper control of the flow of air, waste heat, fuel gas and decarbonizing air to the coke oven battery vertical flame flues. In a regenerative coke oven battery wherein the direction of flow of the air and waste gas is periodically reversed, additional control problems are encountered in the proper sequential operation of the valves controlling the flow of fuel gas and decarbonizing air to the high and low burners in the respective flame flues.

The control of the fuel gas and decarbonizing air flow to the high and low burners in two groups of flame flues and the flow of combustion air and waste heat to the same two groups of flame flues increases the number of sequential steps in the proper operation of the coke oven battery. The steps must be timed and occur in a predetermined sequence. All of the control components associated with the respective groups of flame flues must be actuated in a matched sequential manner. It is highly desirable for maximum safety that the actuators be mechanically interlocked to each other to insure proper sequential operation.

It has been discovered that it is possible to obtain the desired sequential operation of the coke oven control components by a novel unitary reversing mechanism which includes actuators mechanically interlocked by pairs of cam mechanisms connected to each other.

Briefly, this invention includes a mechanically actuated reversing apparatus that includes a plurality of pivot arms connected to control cables. Each of the pivot arms is actuated by two opposing cams driven in timed relation by the reversing machine. The cams are of such a contour that they control the sequence for opening and closing the heretofore mentioned components. The period of time that the components are in an open or closed position is regulated by a clock type timer. With this arrangement there is a positive mechanical linkage between all of the components in the coke oven battery and the reversing machine. The cam mechanisms interlock the controls for the components to assure positive actuation of the components in the preselected sequence so that the controls provide maximum safety for either rich or lean gas heating.

Accordingly, an object of this invention is to provide a reversing apparatus for a regenerative horizontal coke oven battery that controls the flow of air, waste heat and fuel gas to the vertical flame flues.

Another object of this invention is to provide a reversing apparatus for a regenerative horizontal coke oven battery that controls the flow of fuel gas to the high and low burners in the vertical flame flues in a sequential manner and further controls the reversal of the air and waste heat gas in a preselected sequential manner.

Still another object of this invention is to provide a control mechanism for controlling the flow of rich fuel gas and decarbonizing air to the high and low burners in the respective flame flues of a regenerative coke oven battery.

In the accompanying drawings forming a part of this specification there is shown for purposes of illustration a gun flue fired battery and the control mechanism for the components herein discussed. It should be understood that the reversing mechanism may also be utilized with an under-jet battery of the Koppers-Becker design. It is not intended that this invention, however, be limited in its application to the specific type of oven illustrated in the drawings but is broadly applicable to any regenerative coking retort oven which employs both high and low burners in each flame flue. It should be further understood the herein disclosed reversing mechanism can be used with equal facility when the oven is being heated with a lean fuel gas, a rich fuel gas or when heating with lean fuel gas and rich fuel gas simultaneously.

In the drawings:

FIGURE 1 corresponds to a vertical section taken along the line 1—1 of FIGURE 2.

FIGURE 2 is a diagrammatic vertical section taken longitudinally of the gun flue battery illustrated in FIGURE 1 and is taken along the line 2—2 thereof.

FIGURE 3 is a plan view in section taken along the line 3—3 of FIGURE 1.

FIGURE 4 is a diagrammatic plan view of a battery of coke ovens with the reversal mechanism and control means illustrated diagrammatically.

FIGURE 5 is an enlarged fragmentary section similar to FIGURE 1 illustrating in greater detail the control apparatus for controlling the flow of fuel gas and decarbonizing air to the gun flue and for controlling the flow of air to the regenerators and waste gas therefrom.

FIGURE 6 is a fragmentary longitudinal section of the coke oven battery illustrating the control apparatus for supplying fuel gas and decarbonizing air to the gun flues illustrated in FIGURE 2.

FIGURE 7 is a view in vertical section of the valve for controlling the flow of fuel gas and decarbonizing air to respective gun flues that supply the high and low burners within a given flame flue.

FIGURES 8, 9 and 10 illustrate several positions for the distributing valve for the rich fuel gas and decarbonizing air.

FIGURE 11 is an enlarged detail view of the control boxes for controlling the flow of air to the regenerators and the flow of waste gas therefrom, and the apparatus for actuating the control boxes.

Figure 1:
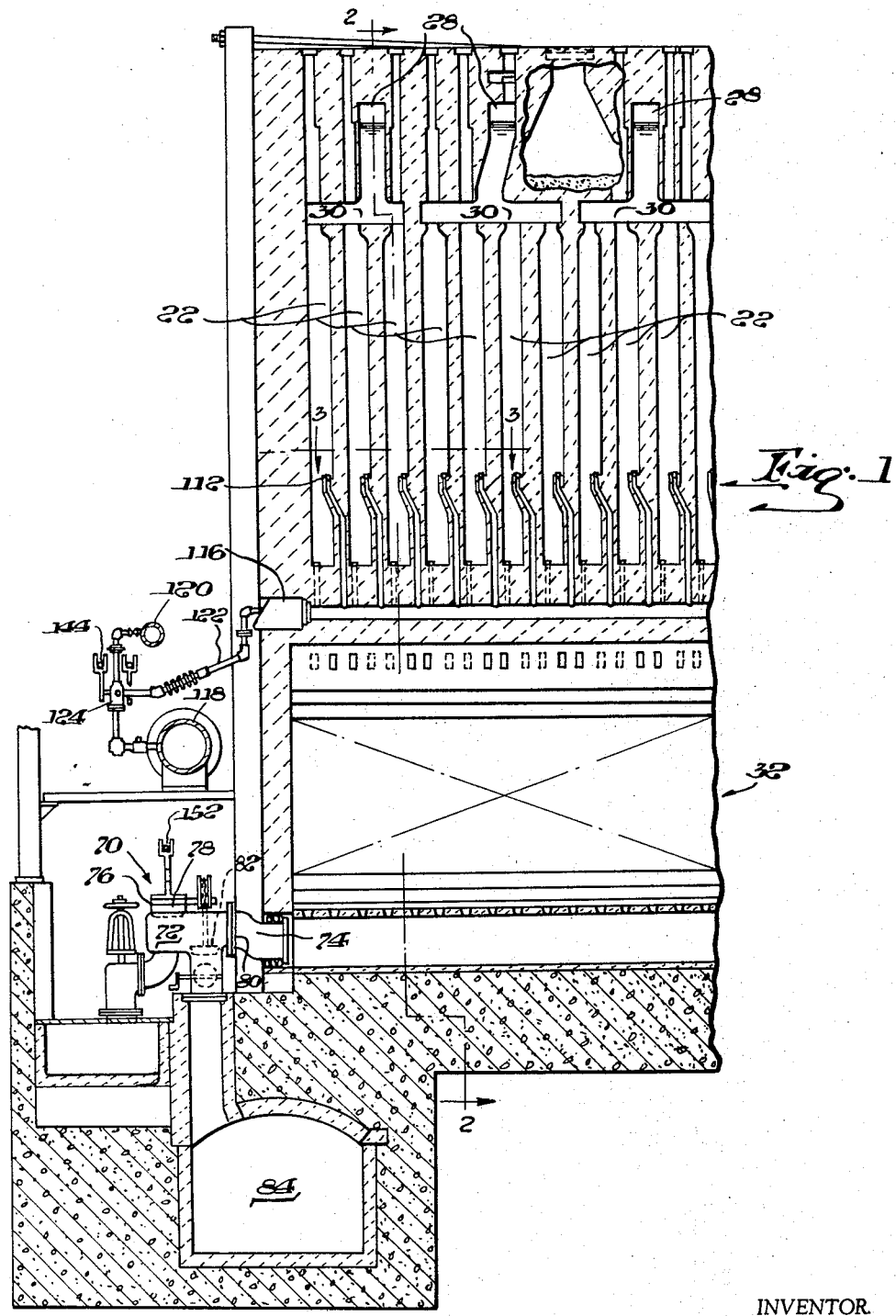
FIGURE 1 is a diagrammatic vertical section taken transversely of a coke oven battery employing a gun flue feed of rich fuel gas to both the high and low burners and illustrating the valve mechanisms actuated by the hereinafter described reversing mechanism.

Referring to the drawings and particularly to FIGURES 1-4, there is illustrated a regenerative coke oven battery generally designated by the numeral 10 that includes a plurality of coking chambers extending transversely thereof. In FIGURE 2, a longitudinal section of the coke oven battery 10, three coking chambers 12, 14 and 16 are illustrated. Heat is supplied to the coking chambers from individual heating chambers through heating walls 18. The heating walls 18 are composed of a series of vertical flame flues which are individual heating chambers disposed in side by side relationship and extending crosswise of the battery 10. In FIGURE 2 transverse rows of vertical flame flues 20, 22, 24 and 26 are illustrated. In FIGURE 1, which is a section taken along the line 1—1 of FIGURE 2, the transverse row of flame flues 22 is illustrated. The rows of vertical flame flues are arranged transversely of the coke oven battery in groups in order to provide collective flow from several of the flame flues in each group to a common crossover duct 28. A horizontal bus duct 30 connects the group of vertical flame flues to the common crossover duct 28. With this arrangement each crossover duct 28 connects two groups of flame flues on opposite sides of a coking chamber positioned therebetween. For example, in FIGURE 2 the flame flue 20 is connected to the flame flue 22 through the crossover duct 28. Similarly, flue 24 is connected to flue 26 on the opposite side of coking chamber 16 by crossover duct 28. With the above arrangement, as is indicated in FIGURE 2, the burning operation is conducted in flame flues 20 and 26 which receive air from the regenerators, as later explained, and the flues 22 and 24 conduct the waste combustion gases from the burning operation through the regenerators. At the end of a preselected period, the system is reversed and the relative functions of the flame flues are reversed so that combustion takes place in flues 22 and 24 and the waste gases are conducted through flues 20 and 26.

Below the coking chambers 12, 14 and 16 in the lower portion of the battery 10 there are a plurality of cross regenerators generally designated by the numeral 32 which extend in a direction substantially parallel to the respective vertical flame flues positioned thereabove. The cross regenerators 32 are in communication with the respective flame flues.

The cross regenerator generally designated by the numeral 32 has a plurality of regenerator chambers indicated in FIGURE 2 by the numerals 34, 36, 38, 40, 42, 44, 46 and 48. These regenerator chambers are separated by walls 50 and include refractory checker work block to retain heat from the waste gases which flow therethrough. There are passageways 52 that connect the respective regenerator chambers with the flame flues positioned thereabove. In the arrangement illustrated in FIGURE 2 the chambers 34 and 36 are connected through passageways 52 to vertical flame flue 20 and regenerator chambers 38 and 40 are connected by passageways 52 to the vertical flame flue 22. Similarly, vertical flame flue 24 is connected by passageway 52 to regenerator chambers 42 and 44. The regenerator chambers 40 and 42 serve as common regenerator chambers for vertical flame flues 22 and 24. Flame flue 26 is connected by passageway 52 to regenerator chambers 46 and 48. Transverse conduits or sole flues 54, 56, 58, 60, 62, 64, 66 and 68 extend transversely of the battery 10 below the respective regenerator chambers 34, 36, 38, 40, 42, 44, 46 and 48 and communicate therewith through suitable passages, as illustrated in FIGURE 1. The conduits 54, 56, 58, 60, 62, 64, 66 and 68 are arranged to convey air to the regenerator chambers and to convey waste gas therefrom.

In FIGURES 1 and 5 the valve mechanism or air box that controls the flow of air or waste gas through conduit 60 is illustrated and is generally designated by the numeral 70. The air box 70 has a housing 72 connected by a pipe section 74 to the conduit 60. The housing has an air inlet 76 with a lid 78 that controls the flow of air through inlet 76 into the internal portion of housing 72. The housing 72 has an outlet opening 80 and a valve 82 arranged to close opening 80. The opening 80 is connected to a main waste gas flue 84 that extends longitudinally on both sides of the battery 10 and is connected to a waste gas stack 86.

In FIGURE 1 the valve member 82 is open and the air lid 78 is closed so that the control mechanism 70 is positioned to withdraw waste gas from regenerator chamber 40 through conduit 60 to the main waste gas flue 84. When the elements of control mechanism 70 are reversed the valve 82 is seated to close outlet 80 and to open air lid 78. With this arrangement air flows into the internal portion of the housing 72 through the conduit beneath the regenerator chambers and into the regenerator chambers positioned thereabove.

The battery 10 is heated by the combustion of a fuel gas in the vertical flame flues. This gas is delivered to the flame flues through a series of gas gun flues that run crosswise of the battery 10 in the floor of the oven below the respective flues. In FIGURE 2 the gun flues are shown as being arranged in pairs 88, 90, 92, 94, 96, 98, 100 and 102. With this arrangement the gun flue 88 supplies fuel gas to all the low burners 104 in the row of vertical flame flues 20 on the pusher side half of the battery 10. The gun flue 90 communicates with all of the high burners 106 in the vertical flame flue 20 on the pusher side of the battery 10 through vertical risers 108 and is arranged to supply fuel gas to the high burners 106. Similarly, the gun flues 92 and 94 communicate with the respective low and high burners 110 and 112 in the vertical flame flue 22. FIGURE 1, which is a section taken through the vertical flame flue 22, clearly illustrates the gun flue 94 communicating with the high burners 112 in each of the flame flues 22 through riser passages 114. The gas gun flue 94 terminates in a gas gun 116 adjacent the pusher side of the battery 10. A similar arrangement is provided for the gas gun flue 92.

FIGURES 5 through 10 illustrate in detail how the rich fuel gas and decarbonizing air are supplied to the gas gun flue previously described. A portion of FIGURE 6 will be described in conjunction with gas gun flues 88, 90, 92, 94, 96, 98, 100 and 102. A common gas main 118 supplies the fuel gas to all the high and low burners in the rows of vertical flame flues on the pusher side of the coke oven battery 10. A similar gas main is arranged to supply fuel gas to the high and low burners on the coke side of battery 10. A parallel conduit 120 is positioned above the main gas conduit 118 and supplies decarbonizing air to the high and low burners, as will be more fully developed later. Pairs of gas gun flues 88 and 90 are connected through suitable conduits 122 to a four-way control valve generally designated by the numeral 124. Similar connections are provided for each pair of gas gun flues. The valve mechanisms 124 are connected by suitable conduits to the gas main 118 and decarbonizing air conduit 120 so that either fuel gas or decarbonizing air can be provided to the pairs of gas gun flues through the valve mechanisms 124.

The valve mechanisms generally designated by the numeral 124 are similar in construction and have generally cylindrical housings 126 with an axially rotatable valve member 128 positioned therein. The valve member 128 is arranged to rotate axially within the cylindrical housing 126 and has an arcuate passageway 130 formed therein. The housing 126 has an inlet 132 that is connected to the decarbonizing air conduit 120; a second inlet 134 is connected to the rich gas main 118. The valve housing 126 has a first outlet 136 connected through conduit 122 to the gas gun flue for the low burners and a second outlet 138 connected to the gas gun flue for the high burners. For example, in FIGURES 6 and 7, the valve mechanism 124 controlling flow to the gas gun flues 88 and 90 would be arranged so that valve outlet 136 is connected through conduit 122 to gas gun flue 88 and outlet 138 is connected to gas gun flue 90. The position of valve member 128 is controlled by a lever 140 mechanically connected thereto so that longitudinal movement of lever 140 as viewed in FIGURE 6 will rotate the valve member 128 within valve housing 126. The levers 140 on each valve 124 that control gas gun flues 88, 90, 100 and 102 are connected to a first control rod 142. The levers 140 associated with valves 124 that control the flow of gas and decarbonizing air to gas gun flues 92, 94, 96 and 98 are connected to a second control rod 144. The longitudinal movement of rods 142 and 144 thus controls the respective valves 124 to supply the fuel gas and decarbonizing air to the high and low burners in a predetermined sequential manner.

FIGURES 8, 9 and 10 diagrammatically disclose the manner in which the valve mechanism 124 connects the respective inlets 132 and 134 to outlets 136 and 138. In FIGURE 10 the outlet 138 is connected through the arcuate aperture 130 in valve 128 to the rich fuel gas inlet 134 so that rich fuel gas from gas main 118 is fed through valve 124 to outlet 138 and to the high burner gun flue as, for example, in FIGURE 6 to gas gun flue 90. Simultaneously the air inlet 132 communicates with outlet 136 so that decarbonizing air passes through outlet 136 of valve 124 to the low burner gun flue 88. The lever 140 moves the valve 128 to this position by longitudinal movement of control rod 142. When lever 140 is in a vertical position, as is illustrated in FIGURES 7 and 9, the decarbonizing air inlet 132 communicates with both outlets 136 and 138 to provide decarbonizing air to both of the gun flues 88 and 90. When the lever 140 is in the position illustrated in FIGURE 8 the rich gas inlet 134 communicates through arcuate passage 130 to the outlet 136 to supply rich fuel gas to the low burner gun flue 88 while decarbonizing air from inlet 132 flows through outlet 138 to the high burner gun flue 90. It will thus be apparent that movement of the lever 140 to the left as viewed in FIGURES 8 through 10 supplies rich fuel gas from gas main 118 to the high burner gas gun flue 90 and simultaneously supplies decarbonizing air to the low burner gas gun flue 88. When the lever 140 is in a vertical position both the low burner gas gun flue 88 and high burner gas gun flue 90 are supplied with decarbonizing air from decarbonizing air conduit 120. When the lever is moved to the right as illustrated in FIGURE 8, rich fuel gas is supplied from gas main 118 to the low burner gas gun flue 88 and decarbonizing air is supplied to the high burner gas gun flue 90. Although a four-way valve 124 is described as supplying fuel gas and decarbonizing air to the burners, it will be apparent that the same sequential operation could be obtained by using a pair of three-way valves instead of the four-way valve 124.

The valve mechanisms 70 which control the flow of air or waste gas to or from the sole flues are illustrated in detail in FIGURE 11. The valve mechanism air lid 78 is pivotally secured to the housing 72 and has a lever 146 extending upwardly therefrom. The lever 146 has an elongated slotted portion 148 adjacent one end to which there is pivotally secured an arm 150. The arm or link 150 is fixedly secured to a control rod 152 by a second link 154. Thus when the rod 152 moves to the right as viewed in FIGURE 11 the lever mechanism 146 pivots the air lid 78 to open the air inlet 76 for passage of air through housing 72. The valve 82 has a rod 156 extending upwardly therefrom which is connected at its upper end by a flexible chain 158 to a carrier 160. The carrier is pivotally secured at 162 to an arm 164 that extends upwardly from the valve housing 72. Actuator linkages 166, 168 and 170 are suitably connected to the housing 72 so that when the air lid 76 is open, the valve 82 is closed, as is illustrated in the valve mechanism 70 on the right-hand side of FIGURE 11, and when the air lid 76 is closed, the valve 82 is open. Thus, for example, the valve mechanisms 70 controlling flow through sole flues 64 and 66 would be in the positions illustrated in FIGURE 11. The valve mechanism 70 on the left-hand side of FIGURE 11 has the air lid 76 closed and the valve 82 open. This would permit waste gas to flow from sole flue 64 through the valve mechanism 70 to the waste gas flue 84. The sole flue 66 in FIGURE 2 is conducting air to the regenerator 46 and the valve mechanism on the left of FIGURE 11 has the air lid 76 open and valve 82 closed to permit the flow of air through valve mechanism 70 to the sole flue or conduit 66.

Referring now to FIGURE 4, which is a diagrammatic illustration of the coke oven battery 10, the reversing mechanism generally designated by the numeral 172 is arranged to control and longitudinally move the respective control rods 142, 144 and 152. Although the rods 142, 144 and 152 are designated control rods, it should be understood that flexible cables or other means may be utilized with equal facility. The rods 142, 144 and 152 have flexible portions which extend around pulleys or the like 174 so that they circumscribe the coke oven battery 10. The reciprocal movement imparted to the rods 142, 144 and 152 by the reversing mechanism 172 is thus transmitted to all of the control components on the coke oven battery. As previously stated, the control rod 152 controls the air and waste gas flow through the valve mechanisms 70 associated with each of the sole flues extending transversely beneath the coke oven. One of the control rods, rod 152, controls the position of all the valve mechanisms 70 and hence the flow of either air or waste gas to or from the sole flues extending transversely of the oven battery beneath the regenerator chambers. A pair of control rods or cables 142 and 144 are utilized to control the respective positions of the plurality of actuator valves 124 associated with the coke oven battery 10. For example, in FIGURE 4 vertical flame flues 20, 22, 24 and 26 are diagrammatically indicated. Vertical flame flues 20 and 26 are controlled by rod 142 and flame flues 22 and 24 are controlled by rod 144. Thus the position of valve 124 for controlling combustion in flame flues 20 and 26 will be actuated in the same sequential pattern. In the same manner flame flues 22 and 24, because of their connection to control rod 144, will also be controlled in the same sequential pattern but in a different timed relation.

THE REVERSING APPARATUS

Figures 13, 14:
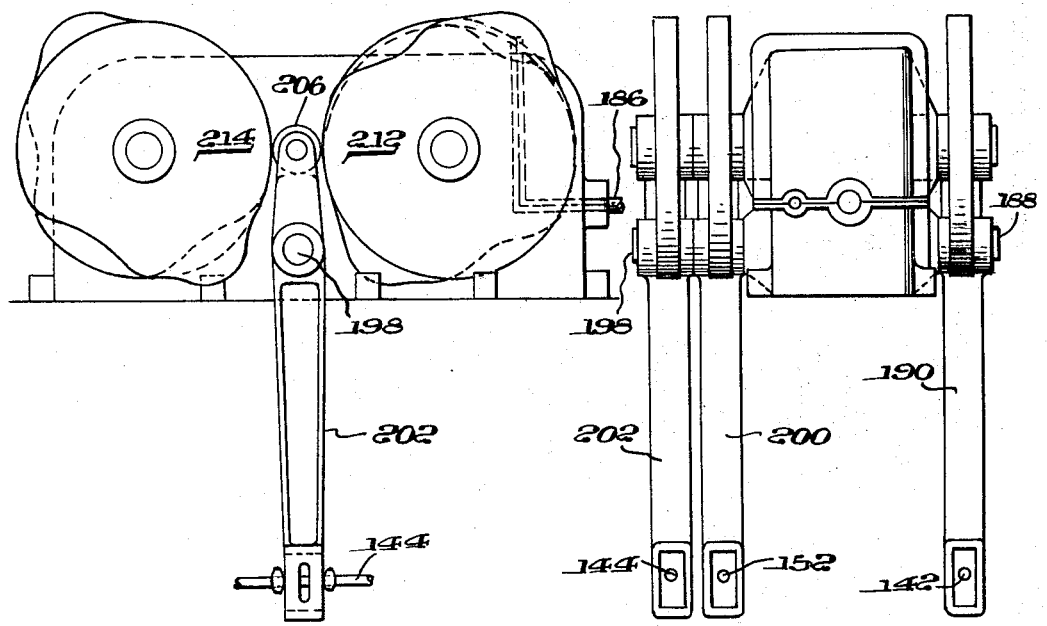
FIGURE 13 is a view in side elevation of a portion of the reversing mechanism in FIGURE 12 illustrating a pivot arm and a pair of cams controlling the pivotal movement thereof.
FIGURE 14 is a view in front elevation taken along the line 14—14 in FIGURE 12.

In FIGURES 12 through 20 there is illustrated in detail the apparatus for controlling the flow of the air, waste gas, fuel gas and decarbonizing air for all of the flame flues in the coke oven battery 10. The reversing mechanism 172 includes a housing 176 that has vertical side walls 178 and 180. A pair of shafts 182 and 184 are supported within the housing 176 and have end portions extending transversely through the side walls 178 and 180. The shafts 182 and 184 are suitably connected to each other by gearing within the housing 176 so that shafts 182 and 184 will rotate in the same direction at the same speed. An input shaft 186 is connected to the gearing (not shown) within the housing 176 and is arranged upon rotation to rotate shafts 182 and 184. The housing side wall 178 has a stub shaft 188 extending laterally therefrom between the end portions of shafts 182 and 184. A lever 190 is pivotally secured to the stub shaft 188 intermediate its end portions and has a roller 192 connected to its upper end portion. A pair of cams 194 and 196 are nonrotatably secured to the end portions of shafts 182 and 184 and have a peripheral configuration whereby upon rotation of shafts 182 and 184 the lever 190 pivots about stub shaft 188 in a predetermined manner. Extending laterally from the housing side wall 180 is a second stub shaft 198. Although a pair of stub shafts 188 and 198 are illustrated, a single shaft extending through the housing could be employed. A pair of levers 200 and 202 are pivotally connected on stub shaft 198 intermediate their end portions and have rollers 204 and 206 connected to their upper end portions. A first pair of cams 208 and 210 are nonrotatably connected to the end portions of shafts 182 and 184 extending outwardly from side wall 180 and have a regular peripheral configuration which, upon rotation of shafts 182 and 184, will pivot lever 200 about shaft 198 to move control rod 152. A second pair of cams 212 and 214 are nonrotatably secured to the end portions of shafts 182 and 184 in a manner similar to cams 208 and 210. The cams 212 and 214 have an irregular configuration, as is illustrated in FIGURE 13, and are arranged upon rotation of shafts 182 and 184 to pivot lever 202 and to move control rod 144.

The shafts 182 and 184 are driven by a drive mechanism generally designated by the numeral 216 which includes an electric motor 218 which is connected through a flexible coupling 220 to the input drive shaft 186. The rotation of shaft 186 by motor 218 is transmitted through the gearing within the housing 176 to the shafts 182 and 184 to rotate the previously described cam mechanisms. There is also provided a manual system for rotating shaft 186 which includes a shaft 222 having a gear 224 nonrotatably secured to its end portion. A handle 226 is secured to the other end portion of shaft 222. When gear 224 is engaged with gear 228, rotation of handle 226 is transmitted through shaft 222 through gears 224 and 228 to the input drive shaft 186. It should be understood that other auxiliary drive means may also be employed, as, for example, the air or gas operated engine 230 positioned adjacent to the motor 218. Suitable gearing is provided to connect the air or gas driven engine 230 to the gear 228. A suitable timing mechanism (not shown) is associated with the reversing mechanism 172 and controls the time period that either the high or low burners are burning. The timer can be adjusted to regulate the time period for either burner.

The cams 194 and 196 are similar in shape to cams 212 and 214. The configuration of cams 212 and 214, which are illustrated in elevation in FIGURES 13 and 15 through 20, will be described in detail. Cams 212 and 214 have approximately one-half of their peripheral edge portion of irregular contour or shape and, because of this irregular shape, function by means of their rotation with the respective shafts 182 and 184 to pivot the lever 202 in a preselected direction.

The cams 208 and 210 which control the flow through the air and waste heat boxes have a peripheral edge portion of regular shape but do not circumscribe a true circle. The cams 208 and 210 have a cammed portion that pivots the lever 200 to open the air boxes or valves 70 for a preselected group of vertical gas flues and closes the other air boxes and opens the valves to the waste heat flue. Thus, the cams 208 and 210 have two operative positions. In one position a group of air boxes are opened for the passage of air therethrough, and in another position the same group of air boxes are closed to the passage of air therethrough, as has been previously described in relation to FIGURE 11. While cams 194, 196, 212 and 214 are actuating the gas valves 124 as later described, the cams 208 and 210 have regular peripheral portions opposing each other so that there is no movement of the lever controlled by cams 208 and 210. With this arrangement the air and waste heat control remains fixed while the valves 124 are being actuated.

Figure 15:
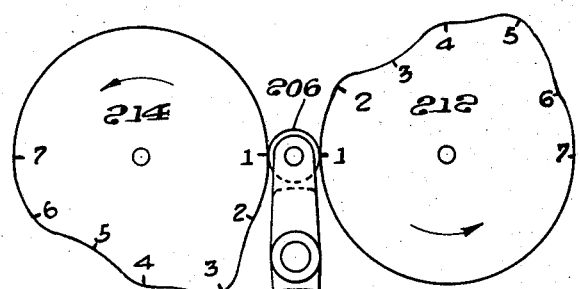
FIGURES 15 through 20 are diagrammatic representations of a pivot arm and cam control mechanisms arranged to control the flow of fuel gas and decarbonizing air to a high and low burner in a bank of flame flues.

Cams 212 and 214 are illustrated in FIGURES 15 through 20 in various positions and will be described in conjunction with the positions of valve member 124 illustrated in FIGURES 7 through 10. The irregular peripheral edge portions of cams 212 and 214 have been designated by numerals 1, 2, 3, 4, 5, 6 and 7 to indicate the respective positions of the cams to control the valve member 124 in the manner hereinafter described. It should be noted that between positions 1 and 7, viewing cam 212 in a counterclockwise manner, the peripheral edge portion is regular in shape so that when the roller 206 of lever 202 is in contact with the peripheral edge portion between 1 and 7 it remains in a substantially vertical position, as illustrated in FIGURE 15.

In FIGURE 15 the cams 212 and 214 are in position 1 and lever 202 is in a vertical position so that the valve 124 is in the position illustrated in FIGURE 9. In this position, carbonizing air is conducted to both the high and low burners so that there is no combustion within the flame flues connected through valve 124 to the fuel gas main 118 and decarbonizing air main 120. Upon rotation of the cams 212 and 214 to position 2, the lever 202 remains in a substantially vertical position to maintain the same conditions as were present when the cams were at position 1 above described.

As the cams 212 and 214 rotate to position 3, the cam 214 has a protuberance beyond a circular periphery defined by the regular portion of cam 214. Cam 212 has an indented portion equivalent to the protuberance of cam 214. Thus the spacing between the peripheral edges of the cams 212 and 214 remains substantially the same; however, because of the protuberance on cam 214, the lever 202 pivots about the shaft 198 to move the rod 144 in the direction indicated by the arrow. In this position the valves 124 to the group of flame flues controlled by rod 144 are moved to the position indicated in FIGURE 10, so that the rich fuel gas is supplied to the high burner and the decarbonizing air is supplied to the low burner.

When the cams rotate beyond position 3 to position 4, the lever 202 returns to its neutral position, similar to that in FIGURE 1. In the neutral position, again both the high and low burners are supplied with decarbonizing air. Further rotation of cams 212 and 214 to position 5 pivots the lever 202 in the opposite direction because of a protuberance of cam 212 peripheral edge portion similar to the protuberance on cam 214 at position 3. The cam 214 has a recessed or indented portion similar to cam 212 at position 3. In position 5 the control rod 144 moves in a direction to actuate the valves 124 to supply fuel gas to the low burner and decarbonizing air to the high burner of the flame flues controlled by rod 144.

Continued rotation of cams 212 and 214 to position 6 moves the lever 202 to a neutral position wherein both the high and low burners of the group of flame flues controlled by rod 144 are supplied with decarbonizing air. Further rotation of cams 212 and 214 from position 6 through position 2 maintains the lever 202 in a neutral position so that the flame flues controlled by the rod 144 are supplied with decarbonizing air through both burners.

Figure 16:
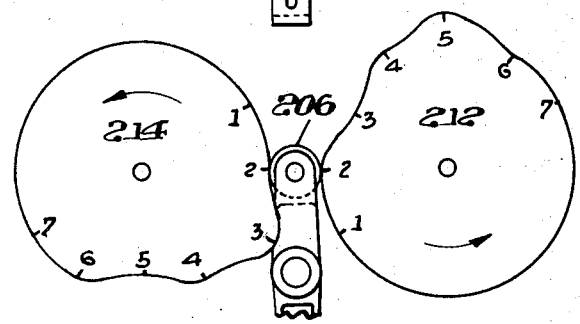
Figure 17:
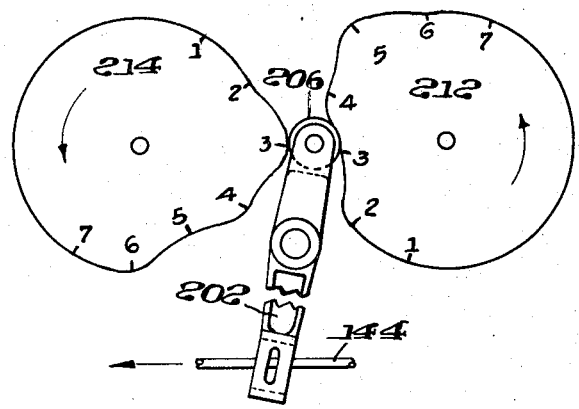
Figure 18:
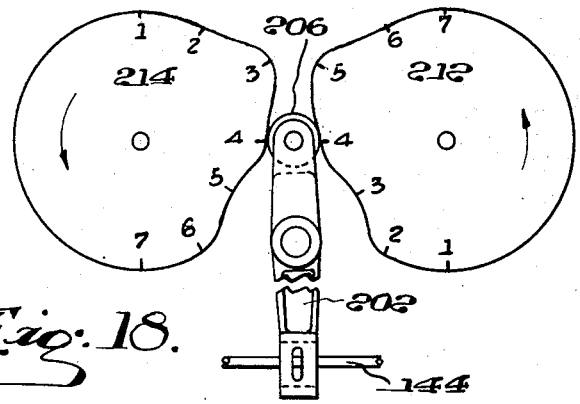
Figure 19:
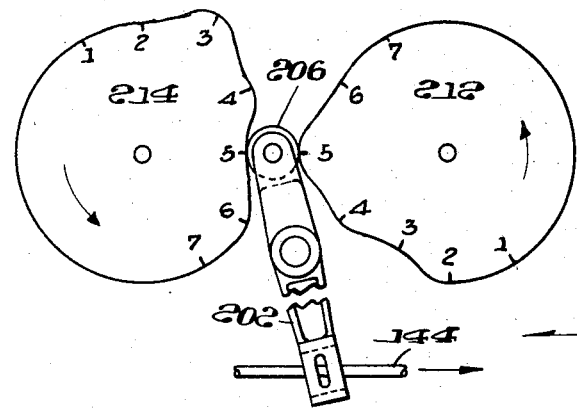
Figure 20:
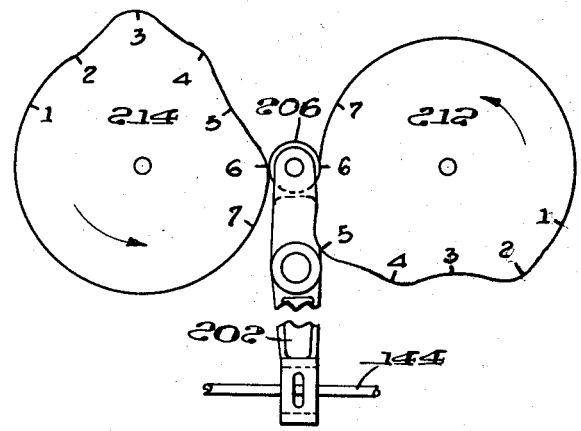
Figure 12:
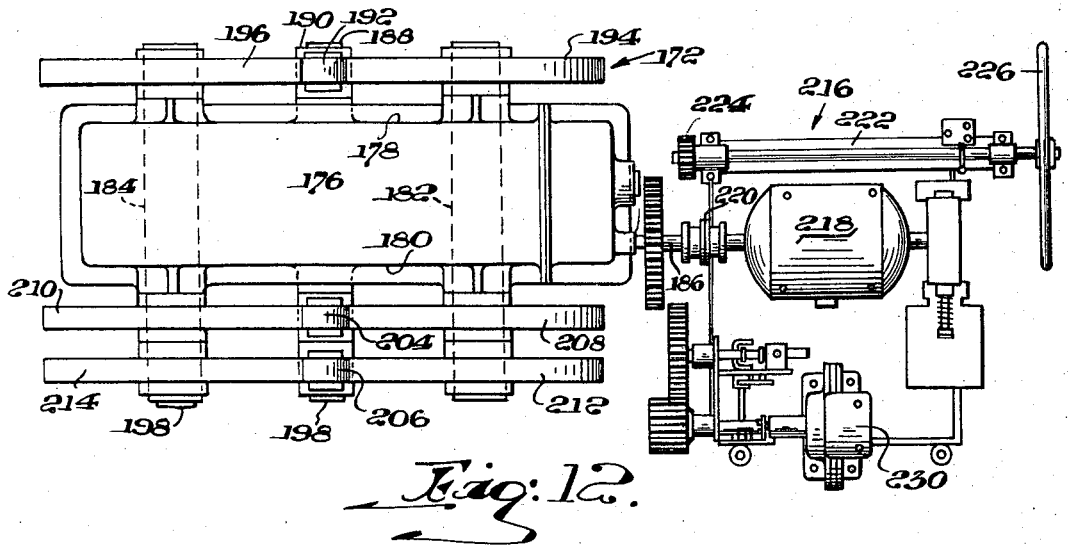
FIGURE 12 is a top plan view of the reversing mechanism.

The cams 194 and 196 which actuate rod 142 are similar in shape to cams 212 and 214 and are connected to shafts 182 and 184 in a manner that they are in 180° opposition to the cams 212 and 214. Thus while cams 212 and 214 are rotating between positions 1 and 7 as indicated in FIGURES 15 through 20, the cams 194 and 196 are moving through positions 7 and 1. When cams 212 and 214 are rotating through the active positions 1 to 7, the cams 194 and 196 are moving through the inactive positions 7 to 1. It will be appreciated that there is an overlap of inactive or neutral positions of control levers 190 and 202 in that the levers remain in a neutral position in positions 2 and 6, as illustrated in FIGURES 16 and 19. Also, when the active cams, that is, the cams rotating through the active positions 1 to 7, are at position 4, decarbonizing air is supplied to all of the high and low burners in the flame flues of the coke oven battery 10.

The regularly shaped cams 208 and 210 that control the flow of air and waste heat will be described in conjunction with cams 212 and 214. In positions 1 and 2, as illustrated in FIGURES 15 and 16, decarbonizing air is supplied to both the high and low burners of the flame flues controlled by rod 144. In positions 1 and 2 the lever 200 is actuated by cams 208 and 210 so that both the air lids 76 are partially open and the valves 82 are partially open. Since this is a neutral position, combustion is not taking place in any portion of the battery since all of the burners are being supplied with decarbonizing air. When the cams 212 and 214 rotate to position 3 as indicated in FIGURE 16, the cams 208 and 210 move lever 200 to actuate the valves or air boxes 70 through cable 152 to open the air lids in air boxes 70 to supply air to the flame flues controlled by rod 144 and to simultaneously open the damper valve 82 for the regenerators connected to the flame flues controlled by control rod 142. Referring to FIGURE 2, with the conditions therein shown, flame flues 20 and 26 would be controlled by control rod 142 so that cams 212 and 214 would, through rod 142, open the valves 124 to supply fuel gas to the high burners 106. The cams 208 and 210 would, in turn, open the air lids of air boxes 70 associated with the horizontal sole flues 54, 56, 66 and 68 so that a supply of air will flow through the respective regenerators to the flame flues 20 and 26. The cams 208 and 210 also control the valves 82 in the adjacent air boxes 70 that are associated with sole flues 58, 60, 62 and 64. Thus cams 208 and 210 open the valves 82 in the air boxes 70 associated therewith to provide means for withdrawing the waste gas from the flame flues 22 and 24 through the regenerators 38, 40, 42 and 44.

As the cams 212 and 214 rotate from position 2 through position 6, the cams 208 and 210, because of their peripheral configuration, maintain the position of the air boxes 70. As the cams 212 and 214 pass position 6 the air lids 76 that were previously opened begin to close in the air boxes 70 and the waste gas valves 82 begin to close. Continued rotation of cams 212 and 214 maintains the valves controlled by rod 144 (FIGURE 4) in a neutral position. However, cams 208 and 210 continue to rotate and open the air lids for the flame flues controlled by the control rod 142 actuated by cams 194 and 196. The cams 194 and 196 follow substantially the same sequence as described for cams 212 and 214 to first open and supply fuel gas to the high burners while decarbonizing air is supplied to the low burners of the flame flues controlled by control rod 142. The valve mechanisms 124 then return to neutral where decarbonizing air is supplied to both the high and low burners in the group of flame flues controlled by rod 142. Thereafter, fuel gas is supplied to the low burner and decarbonizing air is supplied to the high burner in the group of flame flues controlled by control rod 142.

The rotation of shafts 182 and 184, and hence all the cams nonrotatably secured thereto, is carefully controlled to provide heating cycles of preselected periods of time. For example, the high burner in a group of "on" flame flues will remain burning for a predetermined period of time. When the high burners are extinguished at the end of this time period, decarbonizing air is supplied to both the high and low burners. Thereafter the low burner is ignited for a second predetermined period of time to complete the burning cycle for the "on" flame flues. At the end of the second time period the fuel gas to the high burner is extinguished and the flow of air and products of combustion are reversed. These time periods would constitute one-half of a reverse, or 180° travel on the cams. These time periods may be adjusted by the timer mechanism to split the timing into various proportions. Thereafter the cycle is reversed with the "off" flame flues now serving as "on" flame flues controlled by control rod 142 and with the cams traveling 180° to complete the full reverse. When desired, particularly when heating with lean gas, the reversing mechanism can be stopped for an adjustable period of time by means of an adjustable timing mechanism in the neutral position of the reverse from one set of flame flues to the other set of flame flues, to permit purging of combustible mixtures from the combustion system.

The double cam arrangement for each of the levers 190, 200 and 202 assures positive movement of the cam mechanism in both directions so that positive reciprocal longitudinal movement of the control rods 142, 144 and 152 through a preselected distance is obtained. The mechanical interlocking of the cams through the shafts 182 and 184 provides a mechanical means whereby the timed sequential operation of the components is assured and mismatching type malfunctions are not possible. Although three separate control rods 142, 144 and 152 are utilized in this reversing mechanism, the manner in which they are interlocked through the shafts 182 and 184 and the cam mechanisms provides a unitary mechanism where actuation or movement of one of the control rods must, because of the mechanical interlocking, be in a preselected timed sequence with the remaining control rods to provide the desired sequential actuation of the components previously described.

According to the provisions of the patent statutes, the principle, preferred construction and mode of operation of the invention have been explained and what is considered to represent its best embodiment has been illustrated and described. However, it should be understood that within the scope of the appended claims, the invention may be practiced otherwise than as specifically illustrated and described.

What is claimed is:

1. Apparatus for controlling the flow of fuel gas and decarbonizing air to the high and low burners of a group of flame flues in a regeneratively operated horizontal coke oven battery comprising, a control device connected to valve means associated with said group of flame flues, said valve means operable to regulate the flow of fuel gas and decarbonizing air to both the high and low burners of said group of flame flues, said control device operable by reciprocal movement to actuate said valve means to alternately supply fuel gas and decarbonizing air to the high and low burners of said group of flame flues and to supply decarbonizing air to both the high and low level burners of said group of flame flues, a lever connected to said control device and arranged upon pivotal movement to reciprocate said control device, an intermediate portion of said lever pivotally connected to a support means, a pair of cam devices rotatably secured to said support means and having an end portion of said lever therebetween, means to rotate said cam devices in the same direction at the same angular velocity, the peripheral edge portion of each of said cam devices having a protuberance and a recessed portion angularly spaced from each other a preselected circumferential distance, and said cam devices positioned on said support means so that said protuberance of one of said cam devices opposes said recessed portion on said other cam device and upon rotation of said cam devices said recessed portion of said first named cam device opposes said protuberance on said other cam device, said cam devices operable to maintain said lever in a neutral position and supply decarbonizing air to said high and low burners and upon rotation to move said lever end portion positioned therebetween in a lateral direction and pivot said lever in one direction when said protuberance on one of said cam devices opposes said recessed portion and supply fuel gas to said high burners and decarbonizing air to said low burners, said cam devices operable upon further rotation to move said lever end portion in the opposite lateral direction and pivot said lever in the opposite direction when said recessed portion of said first named cam device opposes said protuberance on said other cam device and supply fuel gas to said low burners and decarbonizing air to said high burners.

2. Apparatus for controlling the flow of fuel gas and decarbonizing air to the high and low burners of a group of flame flues in a regeneratively operated horizontal coke oven battery comprising, a control device connected to valve means associated with said group of flame flues, said valve means operable to regulate the flow of fuel gas and decarbonizing air to both the high and low burners of said group of flame flues, said control device operable upon reciprocal movement to actuate said valve means in one position to supply to said group of flame flues fuel gas to said high burners and decarbonizing air to said low burners, in a second position to supply decarbonizing air to both said high and low burners and in a third position to supply fuel gas to said low burners and decarbonizing air to said high burners.

a lever connected to said control device and arranged upon pivotal movement to reciprocate said control device to said first, second and third positions, an intermediate portion of said lever pivotally connected to a support means, a pair of cam devices rotatably secured to said support means and having an end portion of said lever therebetween, means to rotate said cam devices in the same direction at the same angular velocity, the peripheral edge portion of each of said cam devices having a protuberance and a recessed portion spaced from each other, said cam devices positioned on said support means so that said protuberance of one of said cam devices opposes said recessed portion on said other cam device and upon rotation of said cam devices said recessed portion of said first named cam device opposes said protuberance on said other cam device, and said cam devices operable to maintain said level in said second position and supply decarbonizing air to said high burners and said low burners and upon rotation move said lever end portion positioned therebetween in a lateral direction and pivot said lever in one direction when said protuberance of one of said cam devices opposes said recessed portion of said other cam device to thereby move said control device to said first position and supply fuel gas to said high burners and decarbonizing air to said low burners, said cam devices operable upon further rotation to move to a position where said recessed portion of said first named cam device opposes said protuberance on said other cam device to move said lever end portion positioned therebetween to pivot said lever in the opposite direction and move said control device to said third position and supply fuel gas to said low burners and decarbonizing air to said high burners.

3. Apparatus for controlling the flow of fuel gas and decarbonizing air to the high and low burners of a group of flame flues as set forth in claim 2 in which the peripheral edge portions of said cam devices between said protuberance and said recessed portion are regularly shaped to thereby maintain said lever end portion positioned therebetween in a preselected fixed neutral position to maintain said control device in said second position and supply decarbonizing air to said high burners and said low burners.

4. Apparatus for controlling the flow of fuel gas to the high and low burners of two separate groups of flame flues in a regeneratively operated horizontal coke oven battery comprising, a first control device connected to valve means associated with a first group of flame flues, a second control device connected to valve means associated with a second group of flame flues, said valve means operable to regulate the flow of fuel gas to both the high and low burners of said respective groups of flame flues, said control devices operable by reciprocal movement to actuate said respective valve means to supply fuel gas sequentially first to the high burners of said respective group of flame flues and thereafter to the low burners of said respective group, a first lever connected to said first control device and arranged upon pivotal movement to reciprocate said first control device, a second lever connected to said second control device and arranged upon pivotal movement to reciprocate said second control device, an intermediate portion of both of said levers pivotally connected to a support means, a first pair of cam devices rotatably secured to said support means and having an end portion of said first lever therebetween, a second pair of cam devices secured to said support means and having an end portion of said second lever therebetween, means to rotate said pairs of cam devices in timed relation to each other in the same direction, the peripheral edge portions of said cam devices each having a protuberance and a recessed portion, said pairs of cam devices arranged so that said protuberance of one of said cam devices opposes said recessed portion of said other cam device and upon rotation of said pairs of cam devices said recessed portion of said first named cam device opposes said protuberance on said other cam device, said cam devices operable so that said lever end portion positioned between a respective pair of cam devices moves laterally from a neutral position and pivots said lever in a given direction when said protuberance on one of said cam devices opposes said recessed portion on said other cam device and said levers pivot in the opposite direction when said recessed portion on one cam of said pair of cam devices opposes said protuberance on said other cam device, and said pairs of cam devices connected to each other so that when one of said levers is pivoted by a pair of said cams in either direction said other lever remains fixed in a preselected neutral position.

5. Apparatus for controlling the flow of fuel gas to the high and low burners of two separate groups of flame flues in a regeneratively operated coke oven battery as set forth in claim 4 in which said pairs of cam devices are secured to and rotatable with a pair of shafts, means connecting said shafts to each other for rotation at the same angular velocity in the same direction, and drive means for said shafts.

6. Apparatus for controlling the flow of fuel gas and decarbonizing air to the high and low burners of two separate groups of flame flues in a regeneratively operated horizontal coke oven battery comprising, a first control device connected to valve means associated with a first group of flame flues, a second control device connected to valve means associated with a second group of flame flues, said valve means operable to regulate the flow of fuel gas and decarbonizing air to both the high and low burners of said respective groups of flame flues, said control devices operable to supply decarbonizing air to both the high level burners and the low level burners and by reciprocal movement to actuate said respective valve means to supply fuel gas sequentially first to the high burners of said respective group of flame flues and decarbonizing air to the low burners of said respective group of flame flues, and thereafter supply fuel gas to the low burners of said respective group of flame flues and decarbonizing air to the high burners of said respective group of flame flues, a first lever connected to said first control device and arranged upon pivotal movement to reciprocate said first control device, a second lever connected to said second control device and arranged upon pivotal movement to reciprocate said second control device, an intermediate portion of both of said levers pivotally connected to a support means, a first pair of cam devices rotatably secured to said support means and having an end portion of said first lever therebetween, a second pair of cam devices secured to said support means and having an end portion of said second lever therebetween, means to rotate said pairs of cam devices in timed relation to each other in the same direction, the peripheral edge portions of said cam devices each having a protuberance and a recessed portion, said peripheral edge portions between said protuberance and said recessed portion being regularly shaped, said pairs of cam devices arranged so that said protuberance on one of said cam devices opposes said recessed portion of said other cam device and upon rotation of said pairs of cam devices said recessed portion of said first named cam device opposes said protuberance on said other cam device, said cam devices operable to maintain said lever in a neutral position when said regularly shaped peripheral edge portions oppose each other so that said control devices supply decarbonized air to said high burners and said low burners of said respective group of flame flues controlled by said pair of cam devices, said cam devices operable on rotation to pivot said lever in a given direction when said protuberance on one of said cam devices opposes said recessed portion on said other cam device so that said control devices supply fuel gas to said high burners and decarbonizing air to said low burners of said respective group of flame flues, said cam devices operable upon further rotation to pivot said levers in the opposite direction when said recessed portion on one cam of said pair of cam devices opposes said protuberance on said other cam device so that said control devices supply fuel gas to said low burners and decarbonizing air to said high burners of said respective group of flame flues controlled by said pair of cam devices, said pairs of cam devices connected to and rotatable with a pair of shafts, means connecting said shafts to each other for rotation at the same angular velocity in the same direction, and drive means for said shafts, said pairs of cam devices secured to said shafts in a manner that said regularly shaped peripheral edge portion of said one pair of cam devices controls the position of said lever therebetween while said protuberances and recessed portions on said second pair of cam devices controls the position of said other lever associated therewith so that fuel gas is supplied to only one group of flame flues.

References Cited
UNITED STATES PATENTS

| | | | |
|---|---|---|---|
| 1,973,015 | 9/1934 | Pavitt | 202—143 X |
| 2,789,086 | 4/1957 | Schurhoff et al. | 202—135 |
| 3,222,260 | 12/1965 | Becker | 202—135 X |

MORRIS O. WOLK, *Primary Examiner.*

R. E. SERWIN, *Assistant Examiner.*